United States Patent
Brookes et al.

(10) Patent No.: US 8,602,399 B2
(45) Date of Patent: Dec. 10, 2013

(54) REFLECTOR AND GAS SPRING ASSEMBLY

(75) Inventors: Graham R. Brookes, Carmel, IN (US);
Daniel L. Nordmeyer, Indianapolis, IN (US); Joshua R. Leonard, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 1846 days.

(21) Appl. No.: 11/650,819

(22) Filed: Jan. 8, 2007

(65) Prior Publication Data
US 2008/0164089 A1 Jul. 10, 2008

(51) Int. Cl.
*F16F 9/04* (2006.01)

(52) U.S. Cl.
USPC ........................................ 267/64.19

(58) Field of Classification Search
USPC ................. 267/64.11, 64.19, 64.24, 64.27
See application file for complete search history.

(56) References Cited

U.S. PATENT DOCUMENTS

| | | | |
|---|---|---|---|
| 4,532,916 A * | 8/1985 | Aharon | 126/600 |
| 4,787,606 A * | 11/1988 | Geno et al. | 267/64.27 |
| 5,936,161 A | 8/1999 | Fischer | |
| 6,073,491 A | 6/2000 | Fischer et al. | |
| 6,113,081 A * | 9/2000 | Hilburger et al. | 267/64.27 |
| 6,637,269 B2 | 10/2003 | Reck et al. | |
| 6,931,930 B2 * | 8/2005 | Reck | 73/597 |
| 2003/0039171 A1 | 2/2003 | Chiapetta | |

FOREIGN PATENT DOCUMENTS

| | | |
|---|---|---|
| DE | 34 23 602 A1 | 1/1986 |
| DE | 196 48 112 C1 | 3/1998 |
| EP | 1 199 196 A | 4/2002 |
| EP | 1 308 750 A | 5/2003 |

* cited by examiner

*Primary Examiner* — Xuan Lan Nguyen
(74) *Attorney, Agent, or Firm* — Jason A. Houser; Fay Sharpe LLP

(57) ABSTRACT

A reflector includes a first end surface, an opposing second end surface and a plurality of reflector surfaces. A first reflector surface extends from adjacent the first end surface toward the second end surface. A second reflector surface extends from adjacent the first reflector surface toward the second end surface. One or more of the plurality of reflector surfaces can include a plurality of facets or reflector zones. A gas spring assembly and suspension system using the reflector is also disclosed.

21 Claims, 4 Drawing Sheets

REFLECTOR AND GAS SPRING ASSEMBLY

BACKGROUND

The subject matter of the present disclosure broadly relates to the art of vehicle suspension systems and, more particularly, to a reflector having multiple reflecting surfaces for use with an associated ultrasonic sensing device and a gas spring assembly including such a reflector.

The subject matter of the present disclosure finds particular application and use in conjunction with suspension systems of wheeled vehicles, and will be shown and described herein with reference thereto. However, it is to be appreciated that the subject matter of the present disclosure is also amenable to other applications and environments, and that the specific uses shown and described herein are merely exemplary. For example, the subject matter of the present disclosure could be used in support structures, height adjusting systems and actuators associated with industrial machinery, components thereof and/or other such equipment. Accordingly, the subject matter of the present disclosure is not intended to be limited to use associated with vehicle suspensions.

Gas suspension systems for vehicles are known to provide the capability of adjusting the height and/or alignment (i.e., leveling) of the sprung mass (e.g., a body or chassis) of a vehicle relative to the unsprung mass (e.g., a wheel-engaging feature or axle housing) thereof. To enable gas spring assemblies of the gas suspension system to be suitably adjusted to receive the desired height or alignment, height sensing devices are commonly used in association therewith. As such, a wide variety of height sensing devices are known to be used in association with vehicle suspension systems, such as mechanically linked potentiometers and magnetic proximity/position sensors, for example.

Another type of height sensor that is commonly used in association with vehicle suspension systems operates by sending and receiving ultrasonic waves. Typically, the ultrasonic sensor will broadcast a series of ultrasonic waves toward a target area that is suitable for reflecting the waves back to or toward the sensor, which typically also receives the reflected waves. The duration of time required for the ultrasonic waves to travel to the target area and back is then used to calculate or otherwise determine the distance traveled, which can be related to the height of the gas spring or other associated components.

One difficulty with the use of known ultrasonic sensing systems involves the direction in which the reflected waves travel. That is, an ultrasonic sensor or sensing device will normally include an ultrasonic wave transmitting portion and an ultrasonic wave receiving portion. While these two portions can be mounted separately and/or apart from one another, in many constructions the transmitting and receiving portions are mounted within a common housing. As such, the ultrasonic waves must be reflected, from their origin at the sensing device, more or less directly back to the sensing device to be received by the receiving portion.

The foregoing operational constraint is normally not problematic in suspension systems in which the target area moves in relative alignment to or with the sensing device. However, in some suspension systems the target area may move in and out of alignment or otherwise become misaligned with the sensing device. Under such operating conditions, the orientation and/or alignment of the target area may be misaligned with the sensing device. Thus, the ultrasonic waves may not be reflected back toward the ultrasonic wave receiving portion of the sensing device. This can lead to the ultrasonic waves not being received by the sensing portion of the sensing device, which can, in turn, result in unreliable output by the ultrasonic height sensing device or even a lack of operation of the ultrasonic height sensing system for the duration of the misalignment or at least a portion thereof.

Accordingly, it is believed desirable to develop a reflector for a gas spring assembly that is capable of improving the operation and performance of ultrasonic height sensing systems.

BRIEF DESCRIPTION/SUMMARY

A reflector in accordance with the present novel concept is provided for use with an associated gas spring assembly. The reflector is capable of reflecting associated ultrasonic waves toward an associated ultrasonic sensing device in a plurality of aligned conditions relative to the associated ultrasonic sensing device. The reflector includes a first end surface and a second end surface spaced from the first end surface. A first reflecting area extends from approximately the first end surface at a first included angle. A second reflecting area extends from approximately the first reflecting area at a second included angle that is different from the first included angle.

A gas spring assembly in accordance with the present novel concept is provided for use with an associated ultrasonic sensor that is capable of transmitting and receiving associated ultrasonic waves. The gas spring assembly includes a first end member and a second end member spaced from said first end member. A flexible wall is secured between the first and second end members and at least partially defines a spring chamber therebetween. A reflector is supported within the spring chamber and includes a first end surface and a second end surface spaced from the first end surface. A first reflecting surface extends from adjacent the first end surface at a first included angle. A second reflecting surface extends from adjacent the first reflecting surface at a second included angle. Under a first aligned condition of the reflector, the first end surface is aligned approximately transverse to a direction of transmission of the associated ultrasonic waves. Under a second aligned condition of the reflector one of the first and second reflecting surfaces is aligned approximately transverse to the direction of transmission.

A gas spring assembly in accordance with the present novel concept is provided for use on an associated vehicle between an associated sprung mass and an associated unsprung mass thereof. The gas spring assembly includes an upper end member operatively connected to the associated sprung mass, and a lower end member spaced from the upper end member and operatively connected to the associated unsprung mass. A flexible wall is secured between the upper and lower end members and at least partially defines a spring chamber therebetween. An ultrasonic sensor is operable for transmitting and receiving ultrasonic waves within the spring chamber. The ultrasonic sensor is supported along one of the upper and lower end members. A reflector is supported within the spring chamber on the other of the upper and lower end members and is capable of reflecting said ultrasonic waves. The reflector includes a top surface and a bottom surface spaced from said top surface. A first reflecting surface extends from adjacent the top surface at a first included angle. A second reflecting surface extends from adjacent the first reflecting surface at a second included angle.

DETAILED DESCRIPTION

Figure 1:
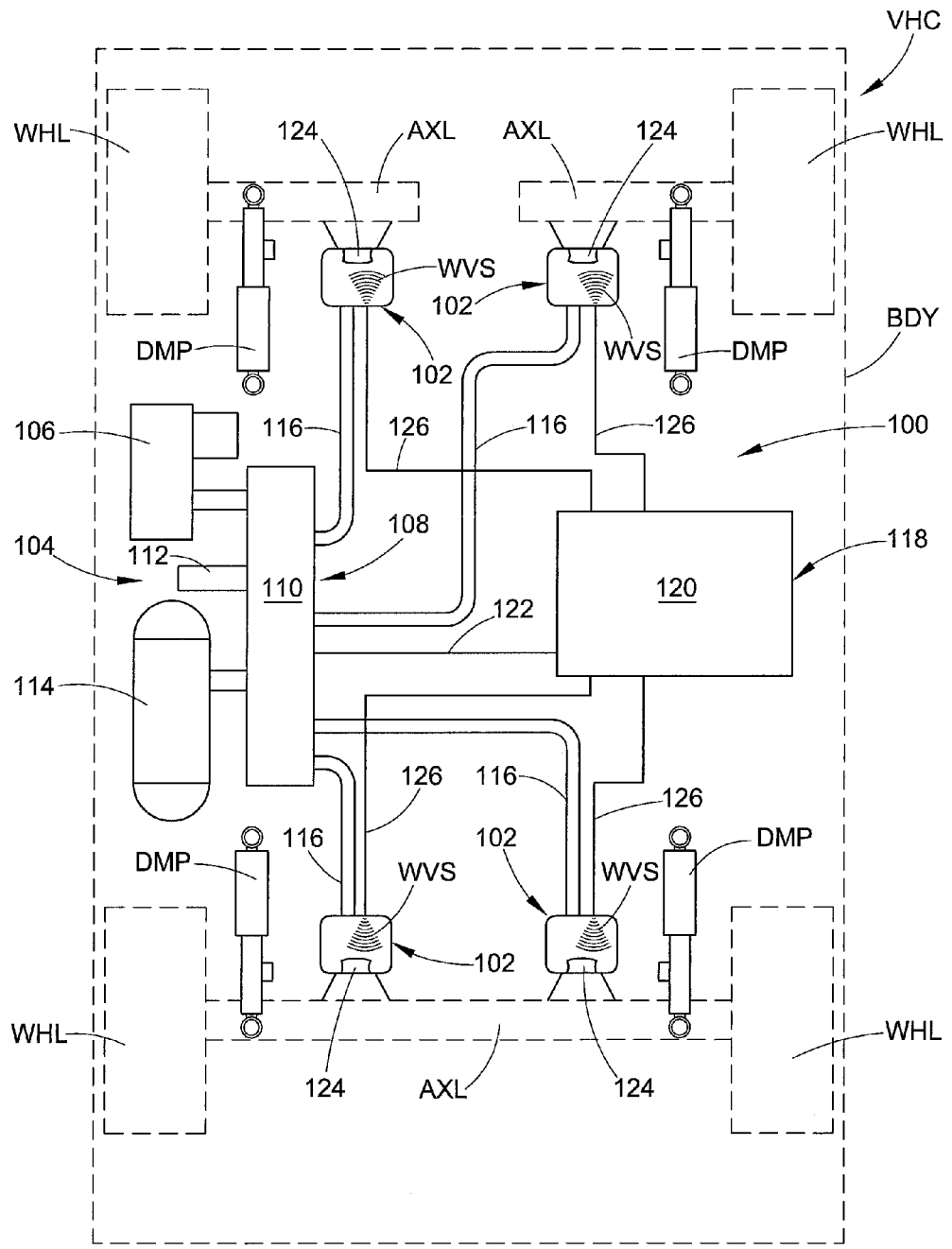
FIG. 1 is a schematic representation of one example of a suspension system of an associated vehicle including gas spring assemblies in accordance with the present novel concept.

Turning now to the drawings, wherein the showings are for the purpose of illustrating exemplary embodiments of the present novel concept and not for the purpose of limiting the same, FIG. 1 illustrates one embodiment of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner. Additionally, it will also be appreciated that such a suspension system of the vehicle can also optionally include a plurality of damping members, such as dampers DMP, for example, and that any such damping members can also be operatively connected between the sprung and unsprung masses of the associated vehicle in any suitable manner.

As discussed above, the suspension system includes a plurality of gas spring assemblies supported between the sprung and unsprung masses of the associated vehicle. In the embodiment shown in FIG. 1, suspension system 100 includes four gas spring assemblies 102, one of which is disposed toward each corner of the associated vehicle adjacent a corresponding wheel WHL. However, it will be appreciated that any other suitable number of gas spring assemblies could alternately be used in any other configuration or arrangement. As shown in FIG. 1, gas spring assemblies 102 are supported between axles AXL and body BDY of associated vehicle VHC. Additionally, it will be recognized that the gas spring assemblies shown and described herein (e.g., gas spring assemblies 102) are of a rolling-lobe type construction. It is to be understood, however, that gas spring assemblies of any other type, kind and/or construction could alternately be used.

Suspension system 100 also includes a pressurized gas supply system 104 operatively associated with the gas spring assemblies for selectively supplying pressurized gas (e.g., air) thereto and selectively transferring pressurized gas therefrom. In the exemplary embodiment shown in FIG. 1, gas supply system 104 includes a pressurized gas source, such as a compressor 106, for example, for generating pressurized air or other gases. A valve assembly 108 is shown as being in communication with compressor 106 and can be of any suitable configuration or arrangement. In the exemplary embodiment shown, valve assembly 108 includes a valve block 110 with a plurality of valves (not shown) supported thereon. Valve assembly 108 can also optionally include a suitable exhaust, such as a muffler 112, for example, for venting pressurized gas from the system. Optionally, pressurized gas supply system 106 can also include a reservoir 114 in fluid communication with valve assembly 108 and suitable for storing pressurized gas.

Valve assembly 108 is in communication with gas spring assemblies 102 through suitable transmission lines 116. As such, pressurized gas can be selectively transmitted to and/or from the gas springs through valve assembly 108, such as to alter or maintain vehicle height at one or more corners of the vehicle, for example.

Suspension system 100 also includes a control system 118 capable of communication with any one or more other systems and/or components (not shown) of suspension system 100 for selective operation and control thereof. Control system 118 includes a controller or electronic control unit (ECU) 120 in communication with compressor 106 and/or valve assembly 108, such as through a conductor or lead 122, for example, for selective operation and control thereof, including supplying and exhausting pressurized fluid to and from gas spring assemblies 102. Controller 120 can be of any suitable type, kind and/or configuration.

Control system 118 also includes one or more ultrasonic height or distance sensing devices (not shown in FIG. 1) that are capable of transmitting and receiving ultrasonic waves WVS that are shown in FIG. 1 as being directed toward reflectors 124. The one or more ultrasonic height or distance sensing devices are operatively associated with the gas spring assemblies and capable of outputting or otherwise generating data, signals or other communications having a relation to a height of the gas spring assemblies or a distance between other components of the vehicle. These ultrasonic height or distance sensing devices are in communication with ECU 120, which receives the height or distance signals therefrom. The ultrasonic height sensors can be in communication with ECU 120 in any suitable manner, such as through conductors or leads 126, for example. It will be appreciated that the ultrasonic height or distance sensing devices can be of any suitable type, kind or construction without departing from the scope and intent of the present novel concept.

As indicated above, it will be appreciated that gas spring assemblies in accordance with the present novel concept can be of any suitable type, kind and/or configuration. One exemplary embodiment of a gas spring assembly 200 that can be representative of gas spring assemblies 102 of suspension system 100 in FIG. 1, for example, includes a first end member 202, a second end member 204 spaced from the first end member, and a flexible wall 206 that is secured between the first and second end members and at least partially defines a spring chamber 208 formed therebetween. Additionally, it will be appreciated that gas spring assembly 200 can be disposed between the associated sprung and unsprung masses of the associated vehicle in any suitable manner. For example, the first end member can be operatively connected to the associated sprung mass with the second end member disposed toward and operatively connected to the associated unsprung mass. In the embodiment shown in FIGS. 2 and 3, first end member 202 is secured along a first structural member, such as associated vehicle body BDY, for example, and can be secured thereon in any suitable manner, such as by using mounting studs 210, for example. Additionally, second end member 204 is secured along a second structural member, such as an axle or a wheel-engaging member WEM, for example, in any suitable manner, such as by using a mounting stud 212 and a corresponding nut 214, for example.

First end member 202 and second end member 204 can be of any suitable type, kind, construction and/or configuration. In the exemplary embodiment shown in FIGS. 2 and 3, for example, first end member 202 is an end plate that is secured to a first end 216 of flexible wall 206 using a roll-crimp connection 218. Additionally, second end member 204 is shown in the exemplary embodiment in FIGS. 2 and 3 as being a piston that has an outer side wall 220 that extends generally between a first or upper end wall 222 and a second or lower end wall 224. A second end 226 of flexible wall 206 is secured on upper end wall 222 of second end member 204 using an end closure 228. The end closure can be secured on the second end member in any suitable manner. In the exemplary embodiment shown, a retaining nut 230 is threadably secured on mounting stud 212 and engages end closure 228. By securing mounting stud 212 on end member 204 using nut 232, the end closure can be drawn tight to upper end wall 222 to thereby secure second end 226 of the flexible wall therebetween. It is to be understood, however, that the arrangement shown and described is merely exemplary and that any other suitable construction and/or configuration can alternately be used.

Figure 2:
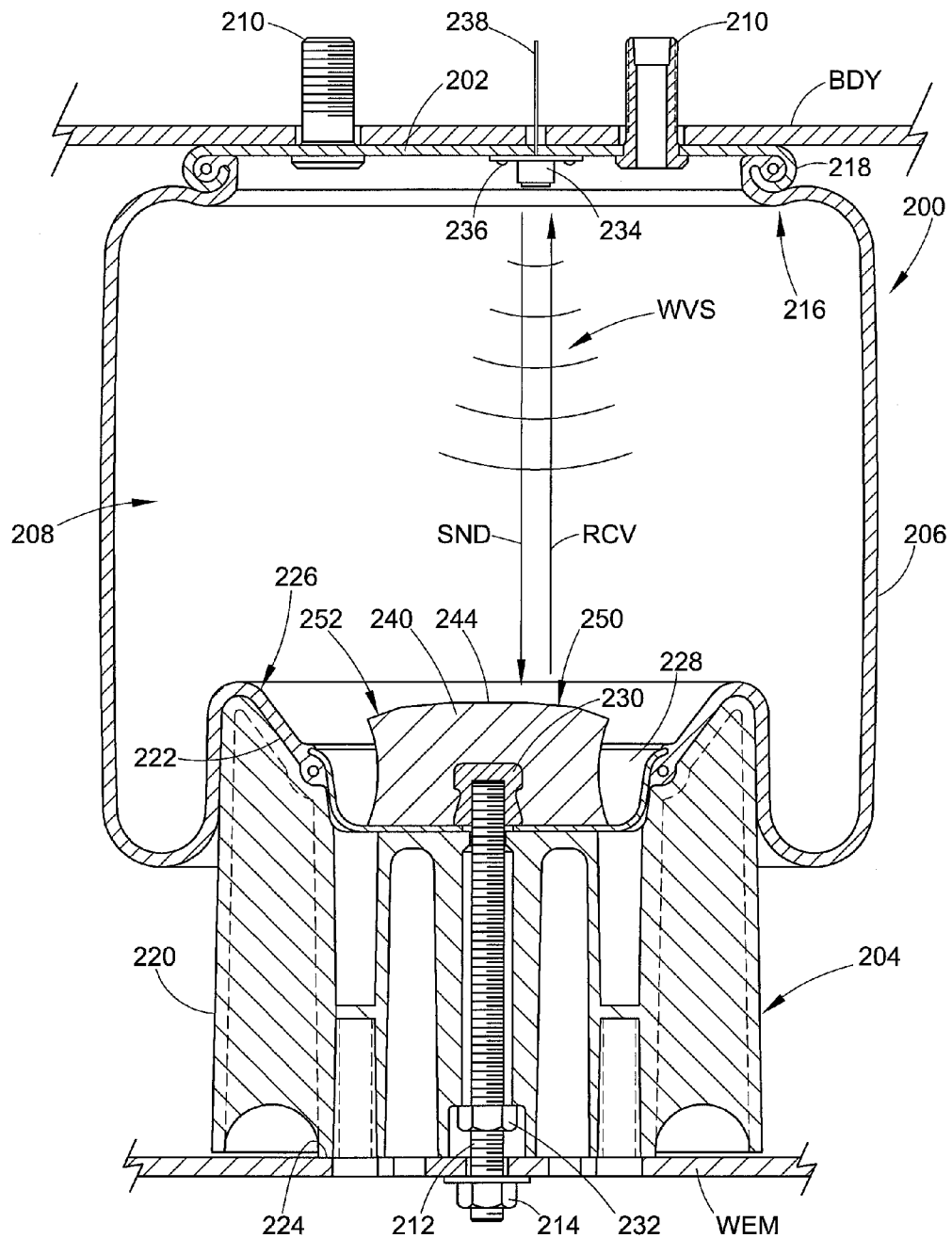
FIG. 2 is a side view, in partial cross-section, of one exemplary embodiment of a gas spring assembly in accordance with the present novel concept with an end member and reflector thereof shown in a first orientation.
Figure 3:
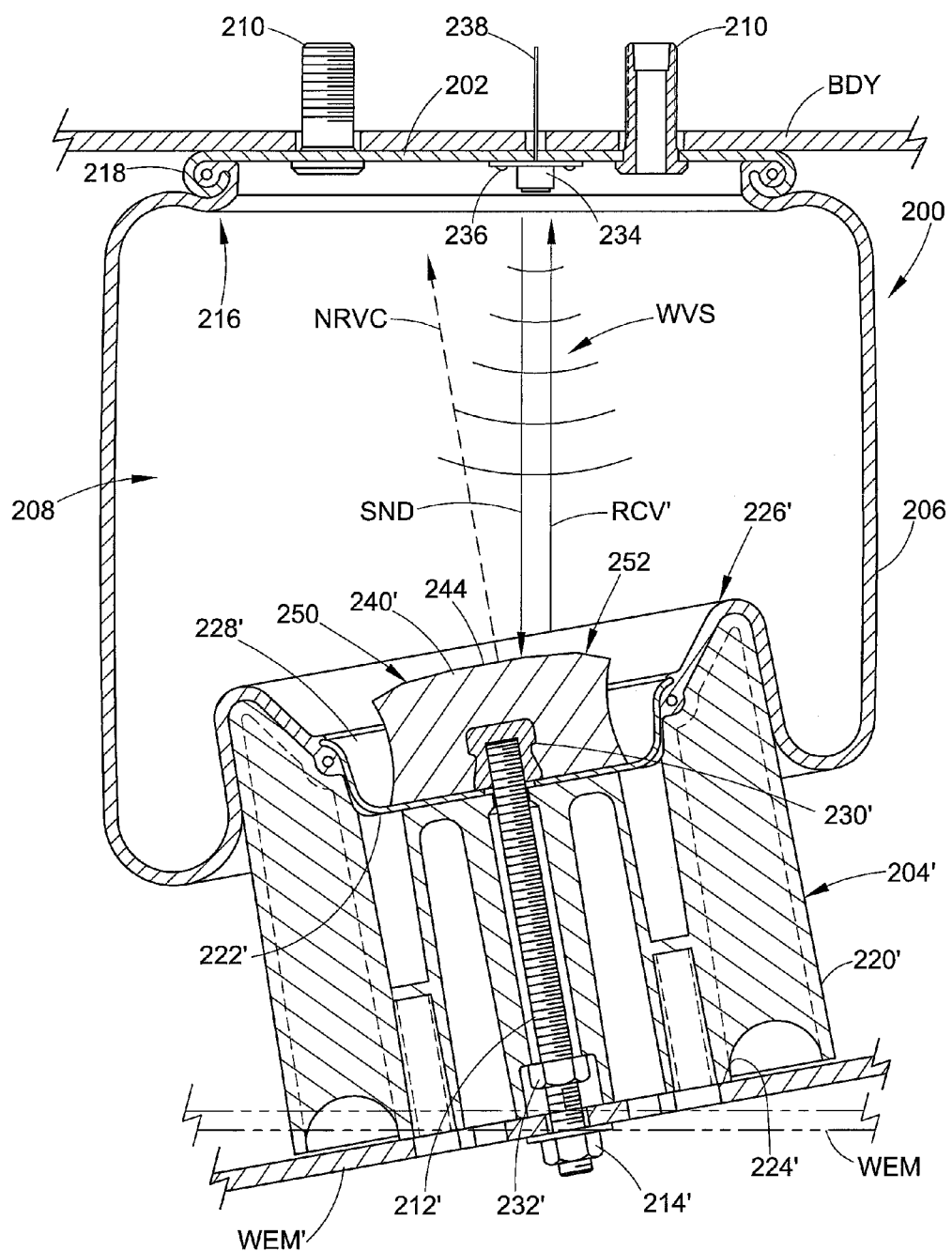
FIG. 3 is a side view, in partial cross-section, of the gas spring assembly in FIG. 2 with the end member and reflector thereof shown in a second orientation.

An ultrasonic height or distance sensing device 234 is shown in FIGS. 2 and 3 as being secured within spring chamber 208 along first end member 202 and being secured thereto using suitable fasteners 236. Ultrasonic sensing device 234 can be connected to other systems and/or components of a vehicle suspension system in any suitable manner. As shown in FIGS. 2 and 3, ultrasonic sensing device 234 includes a lead or connection 238 that can be used for such communication purposes, such as is indicated by leads 126 of control system 118 in FIG. 1, for example.

Ultrasonic sensing device 234 is capable of sending and receiving ultrasonic waves WVS, as indicated by arrows SND and RCV. As such, it will be recognized that ultrasonic sensing device 234 includes an ultrasonic wave sending or transmitting portion and an ultrasonic wave receiving portion located within the same housing. As such, the sending and/or receiving portions can communicate data, information and/or signals corresponding to the sending and/or receiving of such ultrasonic waves through lead 238. In an alternate arrangement, the ultrasonic sensing device could be disposed outside of the spring chamber, such as along the exterior of the first end member, for example. In such an arrangement, an opening or passage can be provided in the first end member adjacent the ultrasonic sensing device and the ultrasonic waves and be transmitted and received by the ultrasonic sensing device through the opening or passage.

As shown in FIGS. 2 and 3, ultrasonic waves WVS are transmitted from ultrasonic sensing device 234 toward a reflector 240, as indicated by arrow SND. Reflector 240 is capable of reflecting the ultrasonic waves back toward the ultrasonic sensing device to be received thereby, as indicated by arrow RCV. Reflector 240 can be formed from any suitable material and can be supported within the spring chamber in any suitable manner. For example, reflector 240 can include a cavity 242 that is received on and engages retaining nut 230 along second end member 204. It will be appreciated, however, that any other suitable mounting arrangement could alternately be used. Additionally, reflector 240 can be formed from any suitable material or combination of materials without departing from the principles of the present novel concept. For example, the reflector can be formed from hard or soft rubber, a thermoplastic elastomer or a more rigid plastic material. In one preferred embodiment, reflector 240 is formed from a material suitable for use as a jounce bumper so that the reflector can operate as both a target for the ultrasonic waves as well as a jounce bumper for the operation of the suspension system.

Figure 4:
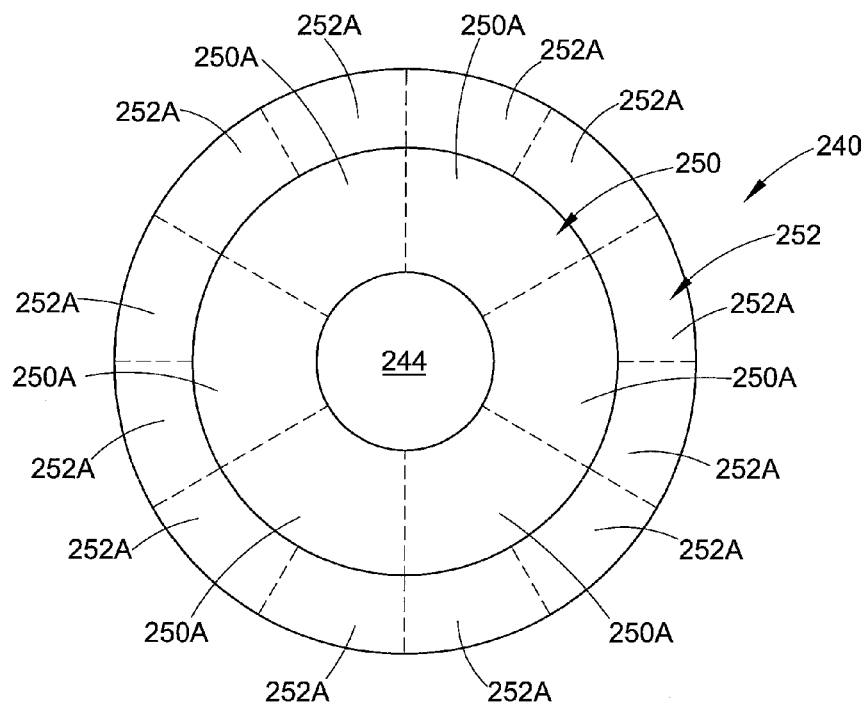
FIG. 4 is a top view of one exemplary embodiment of a reflector in accordance with the present novel concept.
Figure 5:
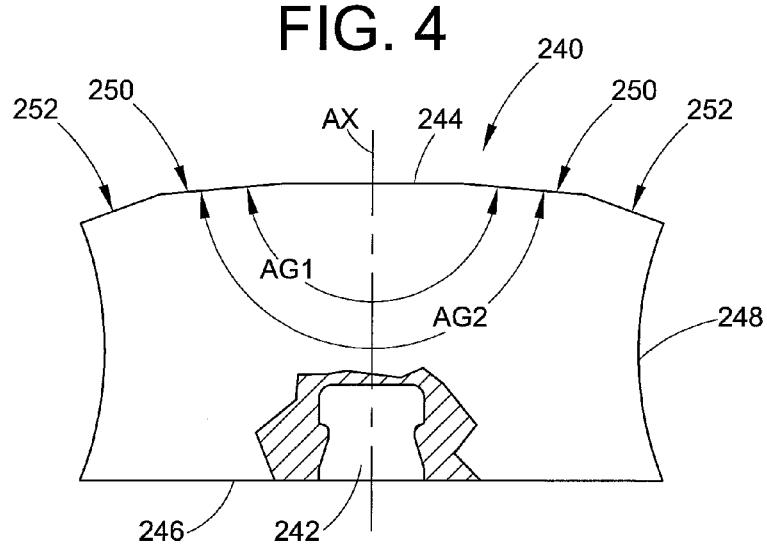
FIG. 5 is a side view, in partial cross-section, of the reflector in FIG. 4.

The exemplary embodiment of reflector 240 is shown in greater detail in FIGS. 4 and 5 and includes a first end surface 244 and a second or opposing end surface 246 spaced from the first end surface. A side surface 248 extends from along second end surface 246 toward first end surface 244. An axis AX is shown in FIG. 5 as extending between first and second end surfaces 244 and 246, and in one exemplary embodiment the side surface extends circumferentially about the axis. In the embodiment shown, side surface 248 includes an approximately concave profile extending inwardly from along the second reflecting surface. However, it will be appreciated that the side surface can take any suitable shape, profile or configuration.

Additionally, reflector 240 can include any number of two or more reflecting surfaces that are angularly disposed relative to a reference surface, such as first end surface 244, for example. In the exemplary embodiment shown, a first reflecting surface 250 extends from adjacent first end surface 244 toward second end surface 246 at a first included angle AG1. A second reflecting surface 252 extends from adjacent first reflecting surface 250 toward second end surface 246 at a second included angle AG2. It will be appreciated that any suitable angles can be used for first and second included angles AG1 and AG2. For example, the first included angle could be from about 100 degrees to about 175 degrees and is preferably greater than the second included angle, which could be from about 95 degrees to about 170 degrees. In the exemplary embodiment shown in FIGS. 2-5, first and second included angles AG1 and AG2 are about 170 and 140 degrees, respectively.

The exemplary embodiment of reflector 240 shown in FIGS. 4 and 5 also illustrates that first end surface 244 and second end surface 246 can be substantially planar. It will be appreciated, however, that the first and second end surfaces can take any suitable form, shape or profile. Additionally, in one exemplary embodiment of reflector 240, first and second reflecting surfaces 250 and 252 can be approximately frustoconical. One advantage of such an arrangement is that the reflector can be secured within the spring chamber without regard to the any specific feature relative to the ultrasonic sensing device or other components or features.

In an alternate embodiment of reflector 240, either or both of first and second reflecting surfaces 250 and 252 can optionally include a plurality of facets or reflecting zones 250A and 252A formed therealong. The plurality of reflecting surfaces are operative to form the corresponding reflecting surface into a plurality of reflecting surfaces. In the exemplary embodiment in FIG. 5, six reflecting zones or surfaces 250A and twelve reflecting zones or surfaces 252A are shown. It will be appreciated, however, that any suitable number of facets could alternately be used.

In one preferred arrangement of this alternate embodiment, a plurality of reflecting zones are formed along each of first and second reflecting surfaces. Additionally, the reflecting zones (e.g., 250A and/or 252A) of each reflecting surface are preferably disposed substantially adjacent one another and are uniformly distributed along the reflecting surface, such as being evenly spaced about axis AX, for example. One advantage of such an arrangement is that the reflector can be secured within the spring chamber without regard to the alignment of the uniformly distributed reflecting zones with the ultrasonic sensing device or other components or features. However, it will be appreciated that any other suitable arrangement or configuration of reflecting zones could alternately be use. For example, the reflecting zones could be of varying size or shape. Furthermore, the reflecting zones can be of any suitable profile or contour. For example, each of the reflecting zones could have one or more inwardly or outwardly extending curves. Alternately, in one preferred embodiment, the reflecting zones could be substantially planar or include a substantially planar portion.

Returning once again to FIGS. 2 and 3, it will be appreciated that second or lower end member 204 is, in FIG. 2, disposed in approximate alignment with first or upper end member 202 and is also in approximately transverse alignment with the direction of transmission of the ultrasonic waves indicated by arrow SND. As such, at least a portion of the transmitted ultrasonic waves reflect off of a target area of the reflector, such as first end surface 244, for example, and travel back toward the ultrasonic sensing device, as indicated by arrow RCV. However, as the second end member moves into a second position that is differently aligned with the first end member and the direction of transmission of the ultrasonic waves, the target area of the reflector also becomes differently aligned.

As illustrated in FIG. 3, this second position in which the various features and components are differently aligned from the position shown in FIG. 2 is generally indicated in FIG. 3 by using primed (') item number and characters. As mentioned above, once the second end member is disposed in a second, non-aligned position, the target area of the reflector is also disposed in a differently aligned position. Accordingly, ultrasonic waves received from the direction indicated by arrow SND could be reflected by the original target area along the direction indicated by arrow NRCV. In which case, the reflected ultrasonic waves may be directed away from the ultrasonic sensing device and, thus, may not be adequately received thereby to provide the desired level of sensor output, performance and/or reliability.

Using reflector 240, however, one or more of reflector surfaces 250 and 252 are positioned as target areas when in the second position in FIG. 3, as indicated by item numbers 240', 250' and 252'. Due to the disposition of the reflector surfaces at angles to the original target area (i.e., first end surface 244') the reflector surfaces can at least partially compensate for the different alignment and, thus, may reflect the transmitted ultrasonic waves back toward the ultrasonic sensing device, as indicated by arrow RCV'. Additionally, the plurality of facets or reflecting zones 250A and/or 252A (not shown in FIG. 3) can optionally be included along one or more of the reflecting surfaces and may further assist in reflecting ultrasonic waves toward the ultrasonic-wave sensing device.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

What is claimed is:

1. A reflector for use with an associated gas spring assembly and which is capable of reflecting associated ultrasonic waves toward an associated ultrasonic sensing device in a plurality of aligned conditions relative to the associated ultrasonic sensing device, said reflector comprising:
   a first end surface;
   a second end surface spaced from said first end surface such that a central axis extends between said first and second end surfaces;
   a first reflecting area extending radially-outwardly from approximately said first end surface at a first included angle and including a plurality of facets circumferentially distributed about said central axis such that said first reflecting area includes a corresponding plurality of reflecting surfaces; and,
   a second reflecting area extending radially-outwardly from approximately said first reflecting area at a second included angle that is different from said first included angle such that an intersection is formed therebetween.

2. A reflector according to claim 1, wherein at least one of said first and second reflecting areas is approximately frusto-conical.

3. A reflector according to claim 1, wherein said plurality of reflecting surfaces are capable of reflecting associated ultrasonic waves in different directions relative to one another.

4. A reflector according to claim 1, wherein said plurality of reflecting zones each include an approximately planar surface portion.

5. A reflector according to claim 1, wherein said plurality of facets is a first plurality of facets, said corresponding plurality of reflecting surfaces is a first corresponding plurality of reflecting surfaces, and said second reflecting area includes a second plurality of facets uniformly distributed about said central axis such that said reflecting area includes a second corresponding plurality of reflecting surfaces.

6. A reflector according to claim 1, wherein said first included angle is from about 100 degrees to about 175 degrees, and said second included angle is from about 95 degrees to about 170 degrees.

7. A reflector according to claim 1 further comprising a side surface disposed between said first and second end surfaces.

8. A reflector according to claim 7, wherein said second reflecting area intersects with said side surface.

9. A reflector according to claim 1, wherein each of said corresponding plurality of reflecting surfaces are of an approximately uniform size and shape with respect to one another.

10. A gas spring assembly for use with an associated ultrasonic sensor that is capable of transmitting and receiving associated ultrasonic waves, said gas spring assembly comprising:
    a first end member;
    a second end member spaced from said first end member;
    a flexible wall secured therebetween and at least partially defining a spring chamber; and,
    a reflector supported within said spring chamber, said reflector including a first end surface, a second end surface spaced from said first end surface such that a central axis extends between said first and second end surfaces, a first reflecting area extending radially-outwardly from adjacent said first end surface at a first included angle, a second reflecting area extending radially-outwardly from adjacent said first reflecting area at a second included angle, and a plurality of facets distributed circumferentially about said central axis such that one of said first reflecting area and said second reflecting area is separated into a corresponding plurality of reflecting surfaces;
    wherein under a first aligned condition of said reflector said first end surface is aligned approximately transverse to a direction of transmission of the associated ultrasonic waves and under a second aligned condition of said reflector one of said corresponding plurality of reflecting surfaces of said one of said first reflecting area and said second reflecting area is aligned approximately transverse to said direction of transmission.

11. A gas spring assembly according to claim 10, wherein said corresponding plurality of reflecting surfaces are of an approximately uniform size and shape, and said corresponding plurality of reflecting surfaces are uniformly spaced about said central axis.

12. A gas spring assembly according to claim 10, wherein said reflector includes an outer side surface extending from one of said first end surface and said second end surface generally axially toward the other one of said first end surface and said second end surface.

13. A gas spring assembly according to claim 10, wherein said first end member includes and end wall and an outer wall, said flexible wall is secured on said end wall and is displaceable along said outer wall, and said reflector is secured on first end member along said end wall thereof.

14. A gas spring assembly according to claim 13 further comprising an end closure disposed along said end wall and secured thereto such that a substantially fluid-tight seal is formed between said flexible wall and said first end member along said end wall, and said reflector is supported along said end wall on said end closure.

15. A gas spring assembly according to claim 14, wherein said end closure is secured on said first end member user an end closure retainer, said reflector includes a recess formed thereinto from along said second end surface that is cooperative with said end closure retainer, and said reflector is disposed along said end closure such that said end closure retainer is received in said recess.

16. A gas spring assembly according to claim 10, wherein said plurality of facets is a first plurality of facets, said corresponding plurality of reflecting surfaces is a first corresponding plurality of reflecting surfaces, and said reflector includes a second plurality of facets distributed circumferentially about said central axis such that the other of said first reflecting area and said second reflecting area is separated into a second corresponding plurality of reflecting surfaces.

17. A gas spring assembly according to claim 16, wherein said first plurality of facets are distributed along said first reflecting area, said first corresponding plurality of reflecting surfaces includes six reflecting surfaces, said second plurality of facets are distributed along said second reflecting area, and said second corresponding plurality of reflecting surfaces includes twelve reflecting surfaces.

18. A gas spring assembly for use on an associated vehicle between an associated sprung mass and an associated unsprung mass thereof, said gas spring assembly comprising:
an upper end member operatively connected to the associated sprung mass;
a lower end member spaced from said upper end member and operatively connected to the associated unsprung mass;
a flexible wall secured between said upper and lower end members and at least partially defining a spring chamber therebetween;
an ultrasonic sensor operable for transmitting and receiving ultrasonic waves within said spring chamber, said ultrasonic sensor supported along one of said upper and lower end members; and,
a reflector supported within said spring chamber on the other of said upper and lower end members and capable of reflecting said ultrasonic waves, said reflector including a central axis, a first end surface, a second end surface axially spaced from said first end surface, a first reflecting area extending circumferentially about said central axis from adjacent said first end surface at a first included angle, a second reflecting area extending circumferentially about said central axis from adjacent said first reflecting area at a second included angle.

19. A gas spring assembly according to claim 18, wherein said reflector includes a first plurality of facets distributed circumferentially about said central axis along one of said first and second reflecting areas such that a plurality of substantially planar reflecting surfaces are formed therealong.

20. A gas spring assembly according to claim 19, wherein said first plurality of facets are distributed along said first reflecting area, and said reflector includes a second plurality of facets distributed circumferentially about said central axis along said second reflecting area such that a second plurality of substantially planar reflecting surfaces are formed therealong.

21. A gas spring assembly according to claim 20, wherein said reflector includes an outer side surface extending from along said second end surface toward said second reflecting area.

* * * * *